US006581874B2

(12) United States Patent
Lemire et al.

(10) Patent No.: US 6,581,874 B2
(45) Date of Patent: Jun. 24, 2003

(54) MOUNTING ASSEMBLY FOR AN AIRCRAFT AUXILIARY POWER UNIT AND METHOD

(75) Inventors: Jacques Lemire, Erie, PA (US); Kirk W. Olsen, Erie, PA (US); Francis J. DePriest, Erie, PA (US); Thomas R. Law, Erie, PA (US); Gerald P. Whiteford, Erie, PA (US); Paul J. Bachmeyer, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/965,942

(22) Filed: Sep. 27, 2001

(65) Prior Publication Data

US 2002/0084381 A1 Jul. 4, 2002

Related U.S. Application Data

(60) Provisional application No. 60/235,676, filed on Sep. 27, 2000.

(51) Int. Cl.$^7$ ................................................ B64D 27/00
(52) U.S. Cl. ........................ 244/54; 244/58; 248/555; 60/797
(58) Field of Search .......................... 244/54, 55, 58, 244/17.27; 60/796, 797; 241/554–557, 55

(56) References Cited

U.S. PATENT DOCUMENTS

| | | | | |
|---|---|---|---|---|
| 2,351,427 A | | 6/1944 | Henshaw | 248/5 |
| 2,365,421 A | | 12/1944 | Lord | 248/5 |
| 2,385,759 A | | 9/1945 | Henshaw | 248/5 |
| 2,605,062 A | * | 7/1952 | Tyler | 244/54 |
| 2,648,509 A | * | 8/1953 | Henshaw | 244/54 |
| 2,685,425 A | | 8/1954 | Wallerstein | 248/358 |
| 2,722,391 A | * | 11/1955 | Krieghoff | 244/54 |
| 4,044,973 A | * | 8/1977 | Moorehead | 244/54 |
| 4,075,971 A | | 2/1978 | Reginensi et al. | 115/41 R |
| 4,111,386 A | * | 9/1978 | Kenigsberg et al. | 244/54 |
| 4,130,258 A | | 12/1978 | Fox | 244/58 |
| 4,494,738 A | | 1/1985 | Britton et al. | 267/140 |
| 4,500,054 A | | 2/1985 | Osborn | 244/54 |
| 4,676,458 A | | 6/1987 | Cohen | 344/58 |
| 4,943,013 A | | 7/1990 | Kapala et al. | 244/54 |
| 5,160,069 A | | 11/1992 | Klaass et al. | 60/39.06 |
| 5,257,952 A | | 11/1993 | Veronesi et al. | 440/53 |
| 5,351,930 A | | 10/1994 | Gwinn et al. | 248/557 |
| 5,413,320 A | * | 5/1995 | Herbst | 248/562 |
| 5,762,295 A | * | 6/1998 | McGuire et al. | 244/54 |
| 6,039,287 A | | 3/2000 | Liston et al. | 244/54 |
| 6,247,668 B1 | * | 6/2001 | Reysa et al. | 244/54 |

FOREIGN PATENT DOCUMENTS

| | | |
|---|---|---|
| WO | WO 95/34769 | 12/1995 |
| WO | WO 98/05553 | 2/1998 |

* cited by examiner

*Primary Examiner*—Galen L. Barefoot
(74) *Attorney, Agent, or Firm*—Edward F. Murphy, III; Michael M. Gnibus (57) ABSTRACT

A system for supporting an auxiliary power unit in an aircraft tailcone wherein the auxiliary power unit is supported by a focalized suspension system supporting the power unit, the focalized suspension system having a plurality of support means each having a line of action, the lines of action intersecting at the focal point. The support system simplifies removal and installation of the auxiliary power unit from and into the aircraft's tailcone.

19 Claims, 10 Drawing Sheets

MOUNTING ASSEMBLY FOR AN AIRCRAFT AUXILIARY POWER UNIT AND METHOD

CROSS-REFERENCING RELATED APPLICATION

This application claims the benefit of United States Provisional Patent Application No. 60/235,676 filed Sep. 27, 2000.

FIELD OF THE INVENTION

The invention relates to an aircraft auxiliary power unit (APU), and more particularly the invention relates to a focalized APU mounting assembly and method for installing and removing the APU from the tailcone section of the aircraft.

BACKGROUND OF THE INVENTION

An aircraft such as a commercial passenger jet typically includes an auxiliary power unit (APU) in the aircraft's tailcone section. The APU is used to supply electrical power to systems and components while the aircraft is parked on the ground, in flight and during aircraft taxiing or landing. The systems and componetry may include for example kitchen appliances, in flight entertainment systems and instrumentation. The APU is generally comprised of a compressor which is operatively connected to a generator to drive the generator. The generator produces the electrical power required to drive the systems and components.

Prior art APU assemblies are suspended from the tailcone ceiling by a complicated matrix of struts and/or support members. The struts are typically several feet long and are of considerable weight. An APU assembly can weigh anywhere between one hundred (100) pounds for smaller aircraft up to one thousand (1000) pounds for larger aircraft.

In order to service or repair the APU, the unit must be removed from the tailcone section. Frequently, in order to gain access to the APU the tailcone must first be disconnected from the fuselage. The tailcone section can extend multiple stories in height. Once the tailcone has been removed, a number of technicians are needed to remove the Auxiliary Power Unit from the tailcone section. To this end, typically a first technician operates a small crane that supports the APU while one or more additional technicians disconnect the APU from the matrix of struts and support rods. The technicians then remove the APU from the tailcone section. When it is necessary to reinstall the APU in the tailcone section, the technicians reverse the process. The prior art method for and removing and installing an APU can take considerable time and during the time the APU is being serviced the plane is grounded.

The foregoing illustrates limitations known to exist in present APU devices and methods for removing and installing APUs in an aircraft tailcone section. Thus, it is apparent that it would be advantageous to provide an alternative directed to simplifying the method for removing and installing the APU and decreasing the time and number of technicians required to remove and install the auxiliary power unit. Accordingly, a suitable alternative is provided including features more fully disclosed hereinafter.

SUMMARY OF THE INVENTION

In one aspect of the present invention this is accomplished by providing an aircraft auxiliary power unit that is supported by a focalized suspension system. The APU may be supported by a suspension system located underneath the APU or above the APU. The suspension system may also be a semi-focalized system. When the suspension system is located below the APU, the APU is supported by a bed with the focalized mounts made integral with the bed. If the system is located along the ceiling, the APU is suspended downwardly from the support members attached to the ceiling.

In either suspension configuration, the APU may be easily removed from and installed into the tailcone as a result of the system of the present invention. As a result of the system the APU may be removed quickly by a single technician. By the mounting assembly of the present invention, removal of the APU from and installing the APU into the tailcone section of the aircraft may be accomplished without first disconnecting the tailcone section from the fuselage. Thus by the present invention APU removal and installation can be achieved in significantly less time than if current methods and systems are used. As a result, a plane is grounded for a minimum period of time.

The system support members may include alignment members to readily locate the APU in the desired location and at the desired orientation. The alignment means may be comprised of nestable frustoconical members. The mounts supporting the APU may be comprised of a plurality of sandwich mounts. Alternatively the support system may be comprised of a number of mounts supported by first and second pylon members and a third mount that includes spherical bearing members between the mount and attachment points along the APU. The spherical bearing members accommodate small APU displacements due to changing ambient conditions such as significant temperature fluctuations.

The foregoing and other aspects will become apparent from the following detailed description of the invention when considered in conjunction with the accompanying drawing figures.

DETAILED DESCRIPTION OF THE PREFERRED EMBODIMENTS

Now turning to the drawing figures wherein like parts are referred to by the same numbers in the several views, FIGS. 1–11 illustrate a first embodiment APU suspension system that serves to limit vibration of the auxiliary power unit and also facilitates easy removal and installation of APU 30 from and into the aircraft tailcone chamber.

Figure 1:
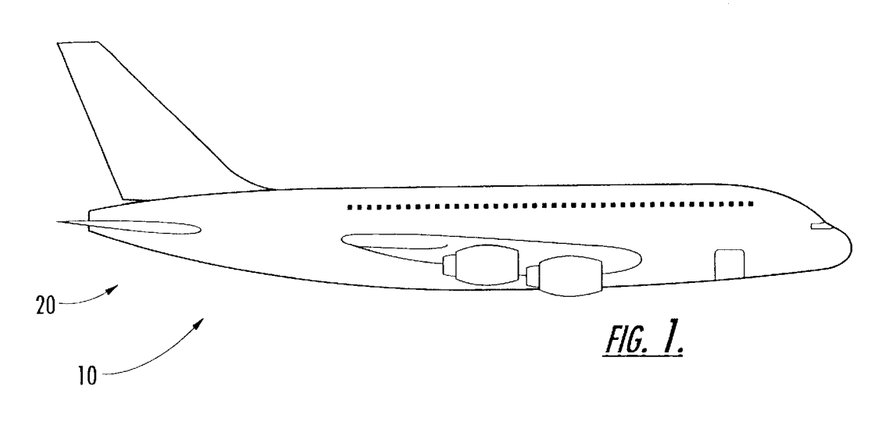
FIG. 1 is a side elevational view of a conventional passenger aircraft that includes the auxiliary power unit mounted in the tailcone in accordance with the present invention.
Figure 2:
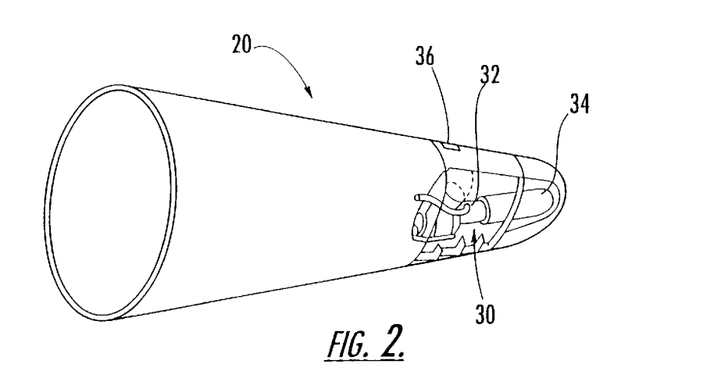
FIG. 2 is a schematic representation of the tailcone of the aircraft of FIG. 1 showing the location and orientation of the auxiliary power unit.
Figure 3:
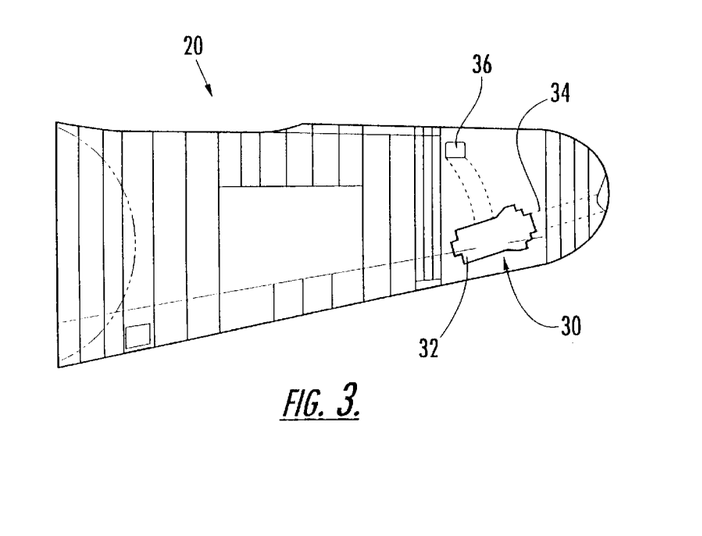
FIG. 3 is longitudinal side view of the tailcone of FIG. 2 showing the position and orientation of the auxiliary power unit in the tailcone.

FIG. 1 illustrates a conventional aircraft 10 that includes tailcone section 20 that houses auxiliary power unit (APU) 30 in accordance with the present invention. The tailcone is of conventional design and comprises a substantially conical configuration. Although the tailcone by its conical shape has a substantially constant interior configuration relative to the APU, for purposes of orientational clarity as the descriptions of the preferred embodiments proceed, as the APU is oriented in the tailcone as illustrated in FIGS. 2 and 3, the portion of the tailcone skin located above the APU shall be referred to as either the ceiling, the first side or the portion above the APU 11 and the section of the tailcone skin located below the APU shall be referred to as either the floor portion, the second side or the portion below the APU 12. The tailcone includes a bottom removable panel 22 and access door 24. See FIG. 6. The APU is supported on the removable lower tailcone panel in accordance with the first embodiment of the present invention and the APU and panel 22 are moved as a single assembly during removal and installation of the APU which will be described in further detail hereinbelow. The access door is used to enter and leave the interior of the tailcone during the removal and installation processes.

The APU is of a conventional design well known to one skilled in the relevant art and includes a compressor 32 that is operatively connected to generator 34. During operation of aircraft 10, air is supplied to compressor 32 through inlet 36 provided along the tailcone ceiling portion 11.

Figure 4:
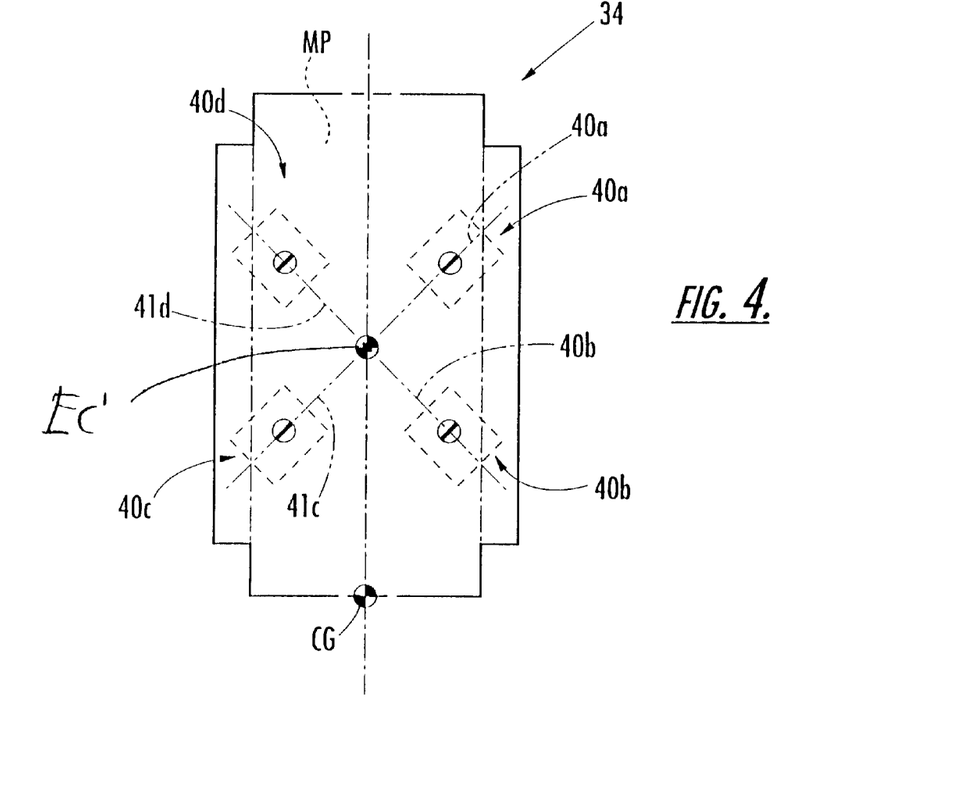
FIG. 4 is a schematic representation of the top view of the auxiliary power unit showing the positions of the auxiliary power unit bed focalized support mounts.
Figure 5:
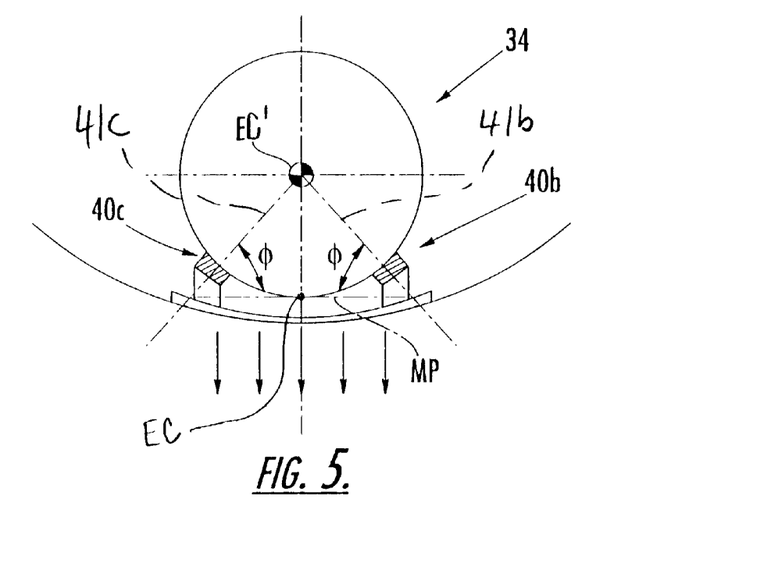
FIG. 5 is plan view of the auxiliary Power Unit of FIG. 4 looking aft.

As illustrated in FIGS. 4 and 5, the APU is supported by four, like mounts 40a, 40b, 40c and 40d. Although devices 40a, 40b, 40c and 40d are described generally as mounts, it should be understood that they could be any device or system suitable for limiting vibration and displacement of the auxiliary power unit 30. Such devices 40a–40d could be referred to as isolators for example. The mounts are conventional sandwich type mounts well known to one skilled in the art and the mounts are angled inwardly towards unit 34 so that the focalized center of the auxiliary power unit is defined at the point of intersection between the respective lines of action 41a, 41b, 41c and 41d for the mounts 40a, 40b, 40c and 40d. The focalized or elastic center is identified as EC in FIGS. 4 and 5. The APU elastic center is defined as the point in space about which the APU will rotate when subjected to an inertial load. The EC is fixed relative to the mount locations. The location of the elastic center depends on the orientation and spring rates of the mounts. In the present invention, the mounts 40a–40d are positioned so that the elastic center is proximate the center of gravity CG for the APU 30. See FIG. 4.

The suspension system of the present invention is a fully focalized system where the mounts are rotated twice to define the elastic center EC'. As shown in FIGS. 4 and 5 the mounts are directed at angle Ø relative to the mounting plane MP and are again reoriented by angle Ø2 relative to lateral axes 13 and 14. Both are angles of rotation are approximately equal to forty-five degrees. In a semi-focalized suspension, the mounts are simply directed by angle Ø so that each pair of laterally spaced mounts would define an elastic center therebetween.

Returning now to the focalized suspension of the present invention, the line of action for each mount is defined as the axis of mount displacement and therefore may be referred to as a compression axis or an extension axis. Each mount's respective line of action in combination with the mounting plane MP defines an angle of orientation or mount focal angle. In the simplest arrangement, the line of action or compression axis for each mount is oriented vertically so that the lines of action are parallel and do not intersect. In this simplest case the mounts are not focalized and the elastic center of the suspension system is located in the mount plane.

In the fully or semi focalized suspension system of the present invention, the lines of action of the respective mounts are disposed at focal angles of less than ninety (90) degrees such that the lines of action intersect at a point above the mount plane MP, and in this way the mounts are focalized. In a semi-focalized system the lines of action are focalized along an axis and in a fully focalized system the lines of action are focalized at a point. Thus the "elastic center" of the suspension system is relocated from the mount plane to a plane above or below the mount plane. The location of the elastic center will depend primarily on the arrangement of the mounts in the mount plane, the stiffness properties of the mounts and the mount focal angles. The elastic center is identified as EC' in FIG. 5.

It will be appreciated that it is not necessary for a suspension system to have a plurality of individual, discrete mounts in order for the suspension system to have an elastic center. A single elastic mount may have a shape, location and properties that give the single spring multiple focalized lines of action which provide a projected elastic center.

Figure 6:
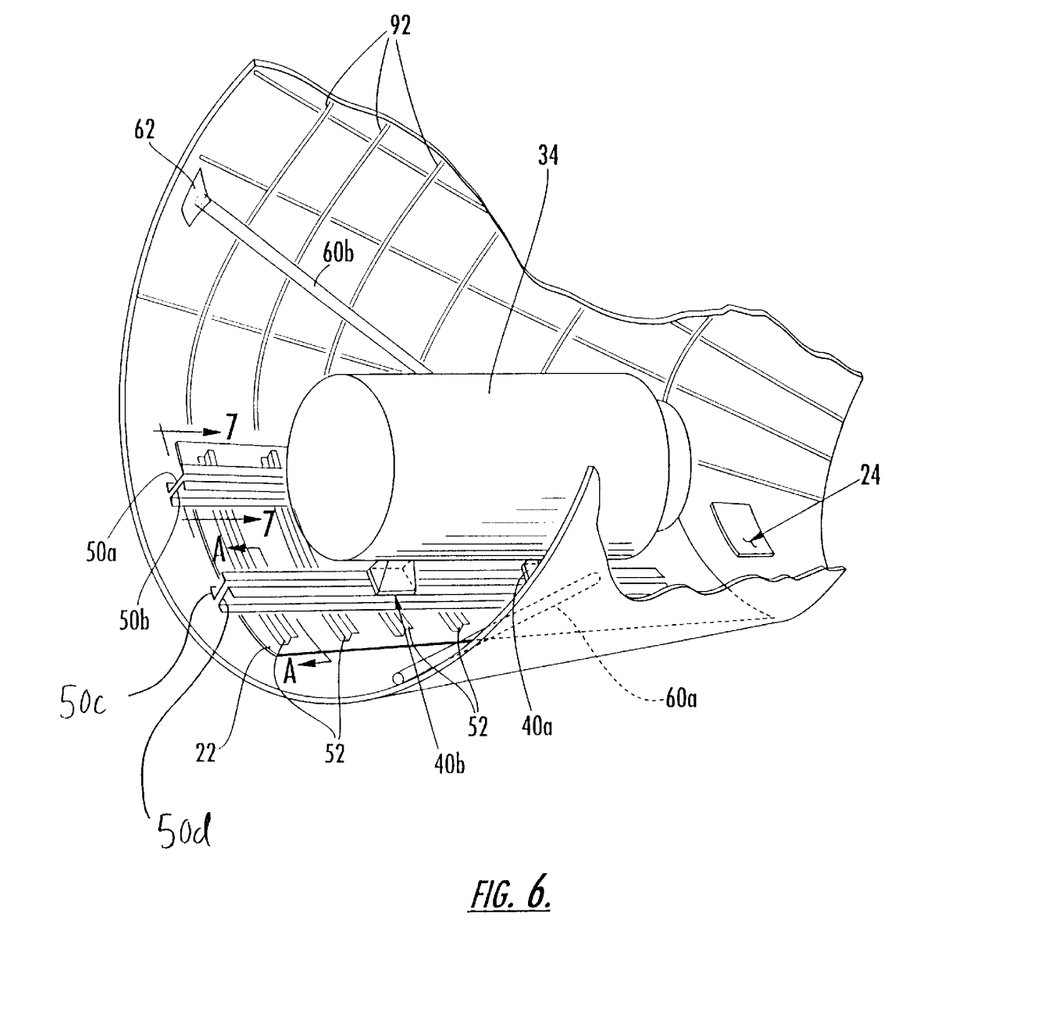
FIG. 6 is an enlarged isometric view of a the tailcone section of FIG. 2 with a portion of the tailcone walls broken away.
Figure 7:
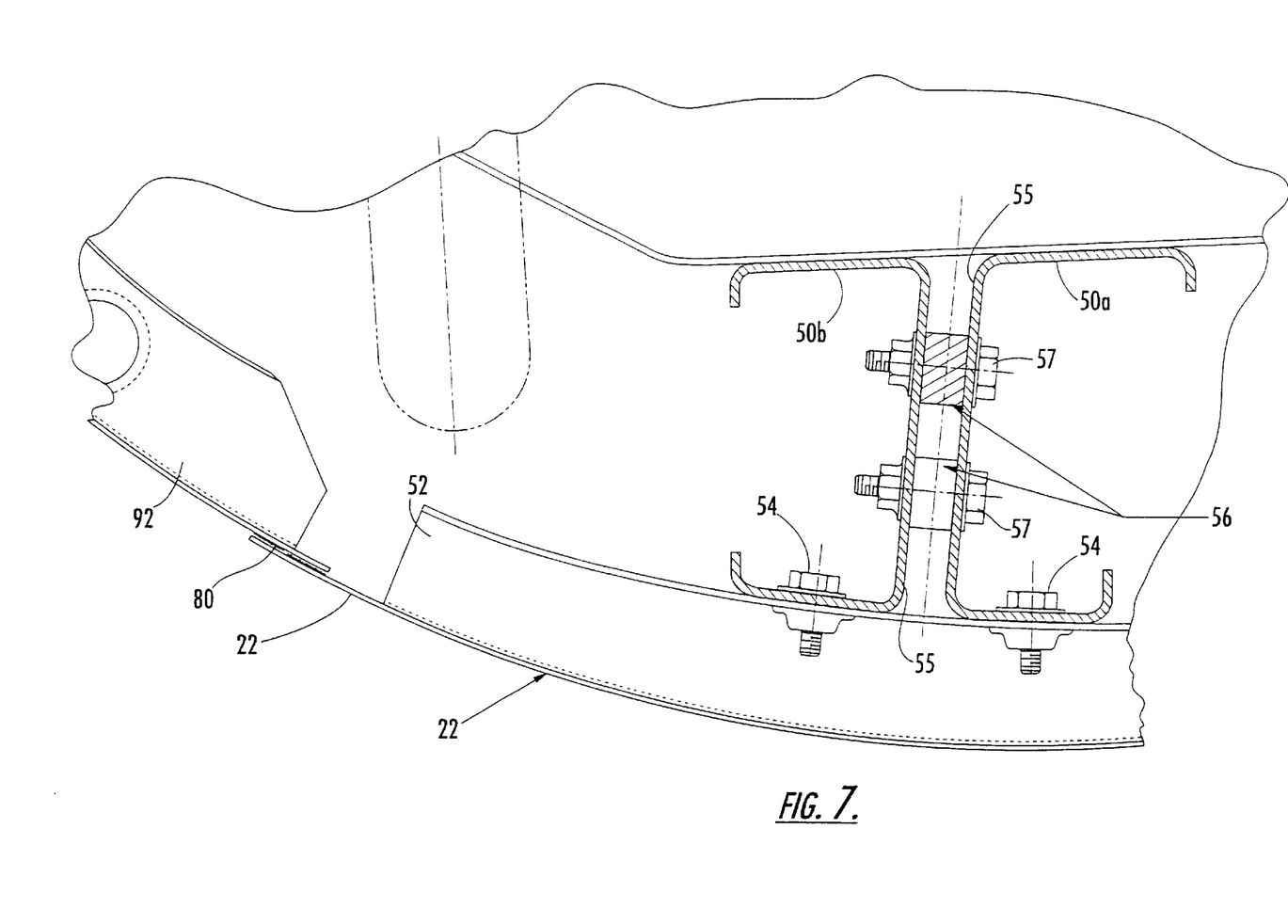
FIG. 7 is a detailed end view of the longitudinally extending support rails taken along line 7—7 of FIG. 6.

The mounts are conventional mounts comprised a combination of elastomeric material and metal and join the APU to longitudinally extending support rails or beams 50a, 50b, 50c and 50d illustrated in FIGS. 6 and 7. The suspension system of the first embodiment of the invention is a fully focalized bed system supported along the bottom of the tailcone 20. As shown in FIGS. 6 and 7, the longitudinal support rails are in turn supported by a plurality of spaced apart lateral rails 52 which in turn are fixed to the interior side of panel 22. The rails 52 are substantially similar and have an S-shaped cross section and are attached to the panel by rivets or other conventional fastening means. The longitudinal rails 50a–50d are substantially the same and each is elongated with a C-shaped cross-section having upper and lower flanges joined by a vertical web. As shown in FIG. 7, the lower flange of each rail is seated on the lateral rails and each longitudinal rail is fastened to the lateral rails by conventional fasteners 54 such as bolts or the like.

Spacer members 56 are inserted between the vertically extending webs of adjacent longitudinal rails. The spacer members are clamped between the adjacent rails as fasteners 57 are tightened. The spacers produce a gap 55 separating the adjacent parallel webs. The presence of the spacers provides additional rigidity to the APU support bed.

The mounts 40a–40d are bolted to the upper flanges of the longitudinally extending support rails in a conventional manner. Supplemental support rods 60a and 60b joint the aft mounts 40a and 40d to the tailcone bulkhead a portion of which is identified as 62. See FIGS. 6 and 11. The support rods are conventional rigid members made from any suitable material. The members connect to the bulkhead and base of the mounts 40a and 40d in a conventional manner using conventional fasteners or any other means that is easily removable during installation and removal of the APU.

Figure 8:
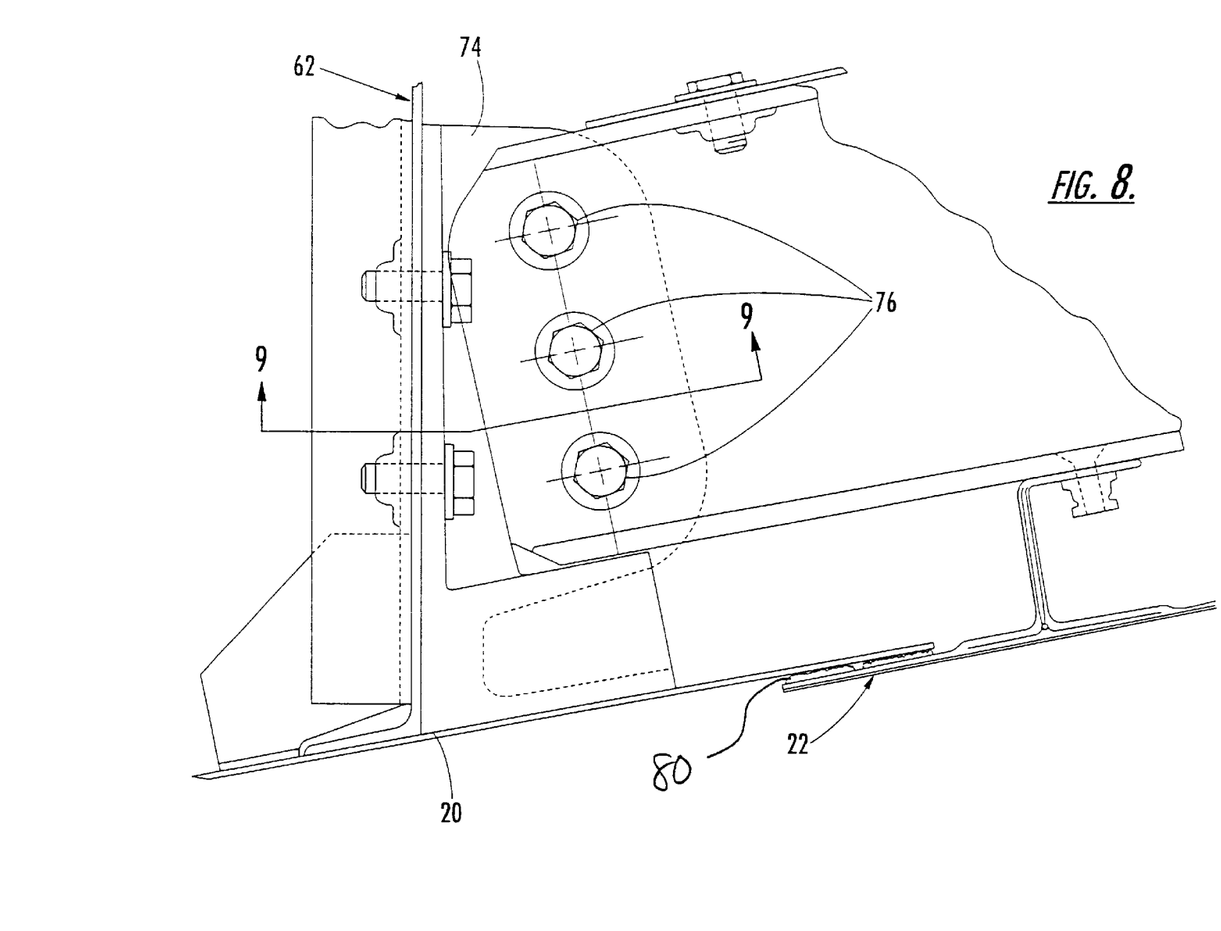
FIG. 8 is a detailed view showing the connection between the support rails and the tailcone bulkhead.
Figure 9:
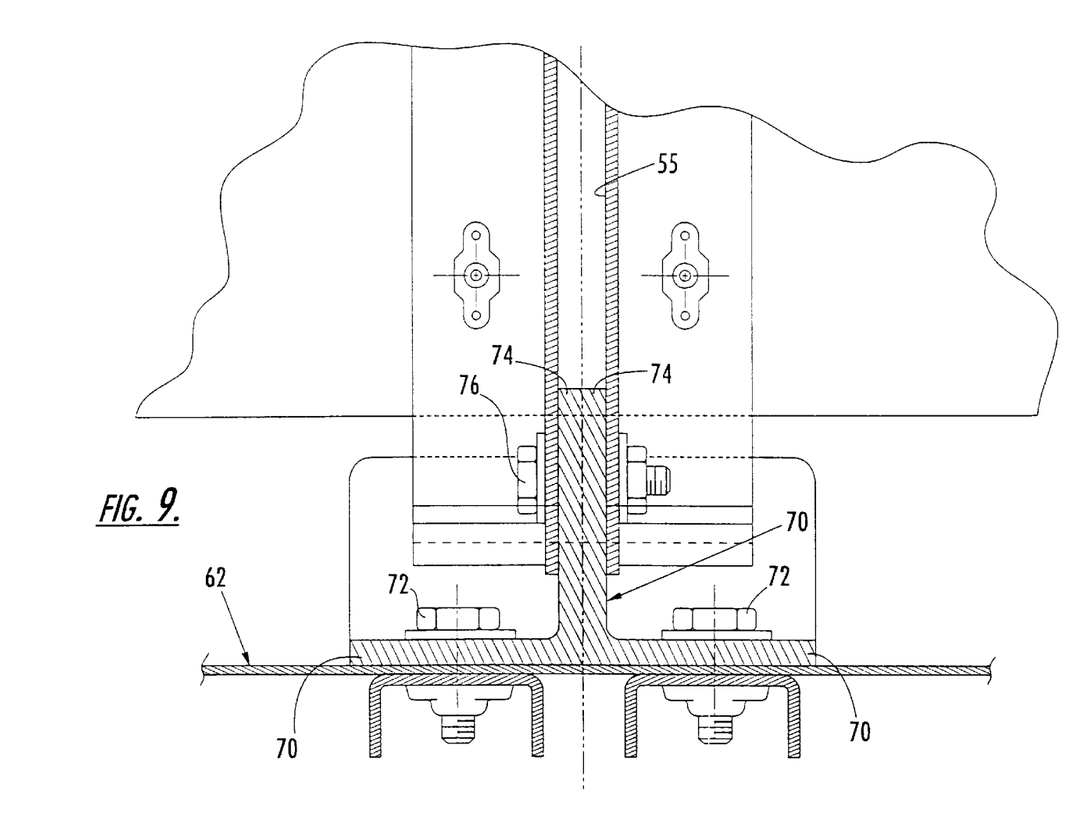
FIG. 9 is a sectional view taken along line 9—9 of FIG. 8.
Figure 11:
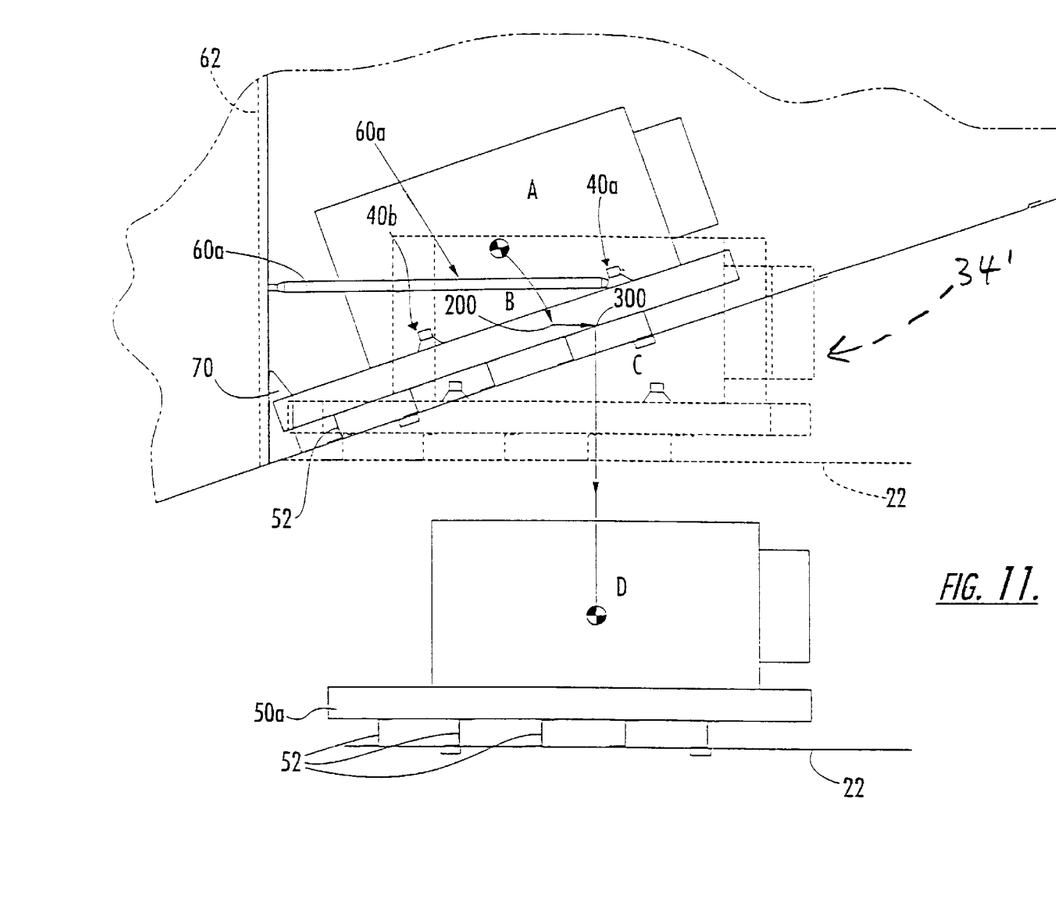
FIG. 11 generally illustrates the method for removing the auxiliary power unit from the tailcone section.

Turning now to FIGS. 8, 9 and 11, the forward directed ends of longitudinal rails 50a, 50b, 50c and 50d are removably connected to fixed anchor brackets 70 which are fixed to the bulkhead 62 by conventional fastener means 72. Each anchor bracket includes an anchor flange 74 that is directed aft as the anchor brackets are fixed to the bulkhead 62. See FIG. 9. The anchor flange 74 is adapted to be located in gap 55, and the rail ends are attached to the bracket flanges by conventional fastening means 76.

As shown in FIG. 7, the peripheral edges of the panel 22 overlap the outer portion of the tailcone. Sealing means 80 is attached to the interior portion of the outer peripheral section of panel 22 and is sandwiched between the inner panel side and the outer portion of the tailcone when the panel 22 is installed. The sealing means may be any suitable material such as but not limited to an elastomer, felt, or silicone.

Figure 10:
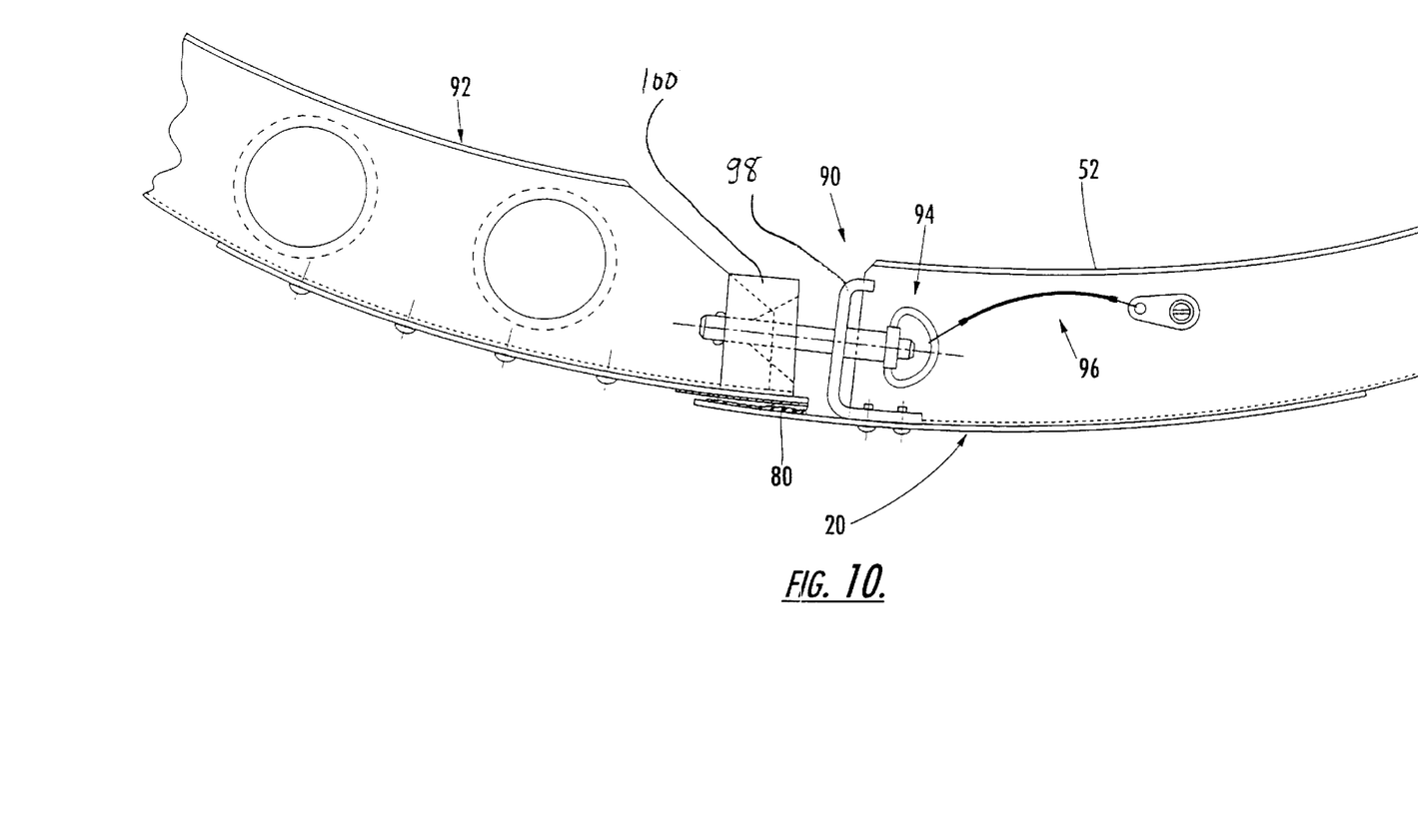
FIG. 10 is a detailed view of a latching means for forming a connection between the lateral structural bed members and the fuselage support ribs.

Latching means 90 is illustrated in FIG. 10. The latching means provides a means for maintaining a substantially rigid connection between each lateral rail 52 and a corresponding adjacent air frame member 92. Attachment pin 94 is tethered to rail 52 by leash 96 which is fixed to the respective rail. The pin is inserted through guide member 98 and into retaining member 100. The retaining member has inwardly tapered walls and is widest at the inlet. In this way, insertion of the pin end into the retaining member is greatly simplified. The latching means prevents the panel to loosen unintentionally and also helps to maintain the desired alignment between the rails 52 and airframe members 92 to thereby ensure accurate placement of panel 22 over opening 102 in the tailcone 20.

Removal of the APU will now be described. When it is necessary to remove the APU from the tailcone, the technician enters the tailcone through panel 24 and disconnects the compressor from the generator 34. Then the support rods are disconnected from mounts 40a and 40d. Finally, the fasteners 76 are removed and rails 50a–50d are disconnected from anchor brackets 70. The anchor flange is maintained in gap 55 after being disconnected. The panel is supported from below by a small crane (not shown). After making the required disconnection, the assembly 35 is rotated about the anchor brackets and focalized center EC' is moved at an angle until the center reaches point 200 identified in FIG. 11. The unit is then translated substantially horizontally so that the focalized center is moved to about point 300. The assembly is translated until the anchor flanges are removed from gaps 55. The assembly is then lowered vertically in a controlled manner by crane until the panel 22 is located on the required support surface such as grade or another suitable surface. The moved assembly is identified as 34' in FIG. 11.

When it is necessary to reinstall the APU, the removal process steps are executed in reverse. The unit is raised vertically until the focalized center is substantially at point 300. The anchor flanges are inserted in gaps 55 and then the unit is rotated counterclockwise until the unit is located at the required position in the tailcone chamber.

If the bed focalized system were made semi-focalized, laterally aligned mount pairs 40a and 40b and 40c and 40d would be directed inwardly and toward each other so that their lines of action were oriented at an angle Ø previously described. In such a semi-focalized suspension system the mounts would not be reoriented at any other angle. Rotation would be limited to the single angle Ø. The mounts or isolators would be mounted in the manner previously described in conjunction with the fully focalized system. The elastic centers of the mounts would be located along or near the axis of location for the APU center of gravity, CG. See FIG. 4. The APU is installed and removed in the manner previously described.

Figure 12:
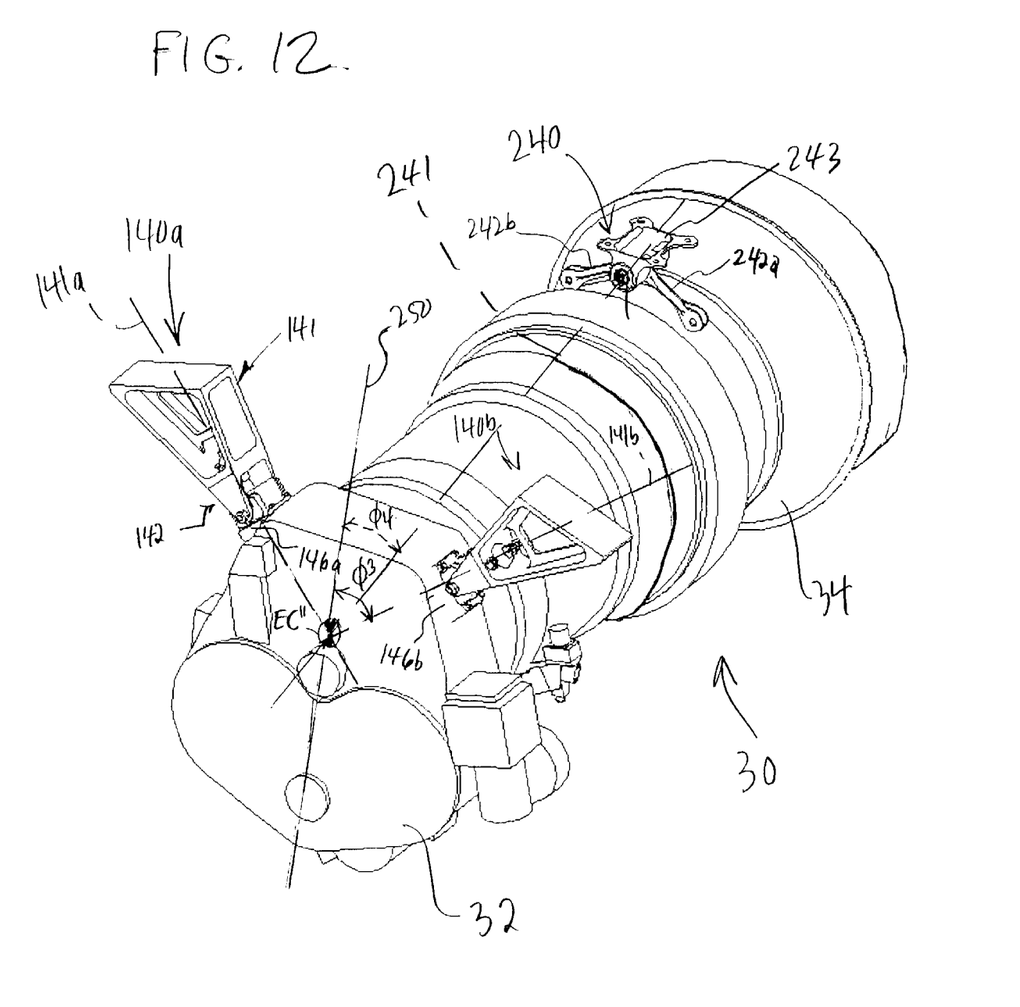
FIG. 12 is an isometric view of an auxiliary power unit supported by a second embodiment suspension system.
Figure 13:
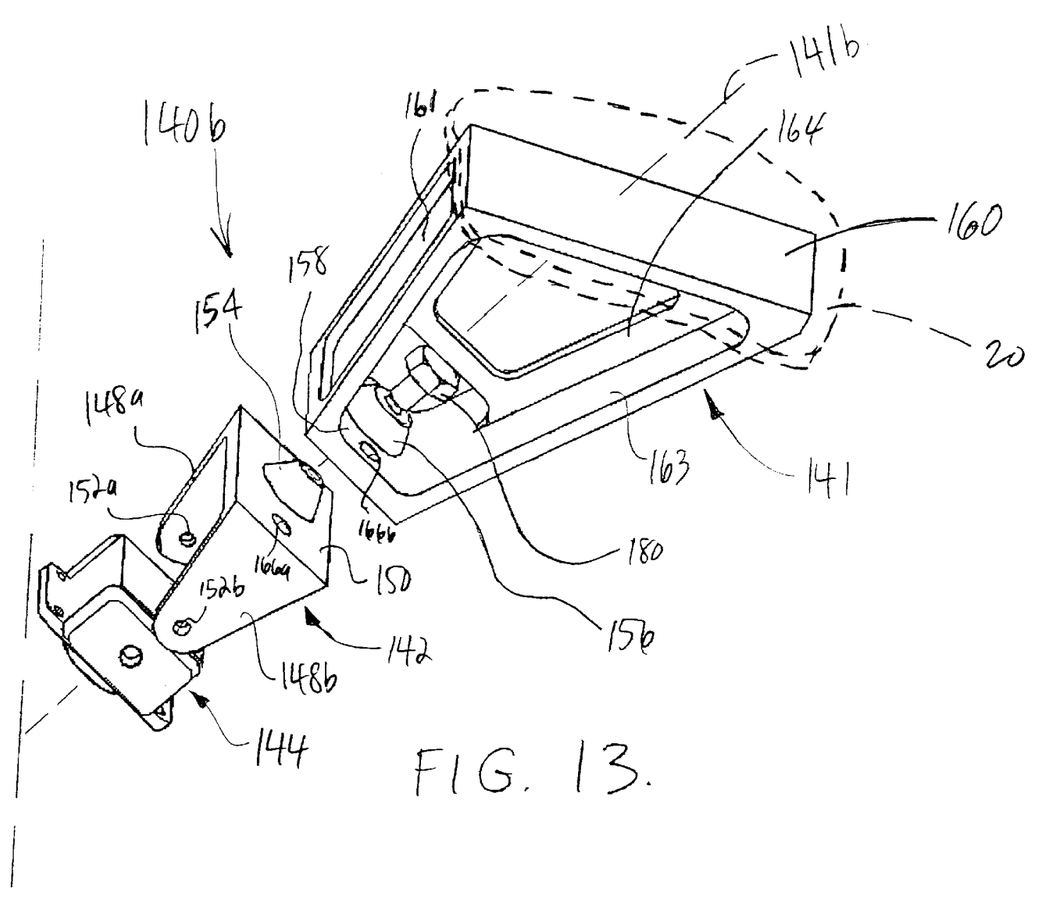
FIG. 13 is an exploded assembly view of one of the support members comprising the second embodiment suspension system.

An alternate embodiment suspension system is shown in FIGS. 12 and 13.

As shown in the alternate embodiment suspension system, the APU 30 is supported above the APU from the tailcone ceiling by support members 140a, 140b and 240. The system is fully focalized. The support members 140a and 140b have lines of action 141a and 141b located in a front plane defined by the lines 141a and 141b and oriented at an angle Ø3 of about 45 degrees relative to vertical axis 250. The line of action 241 for support member 240 is oriented about an angle of Ø4 located in the midplane of the APU where the plane is defined by axis 250 and line of action 241. In this way the lines of action 141a, 141b and 241 intersect to define the elastic center EC" shown in FIG. 12. As with the previous embodiment of the invention, the location of the elastic center is dependent on the operational characteristics and physical properties (e.g. stiffness) of mounts or isolators that are used as well as the chosen lines of action.

The support members 140a and 140b are alike so that as the description of the support members proceeds, unless otherwise required only support member 140b as illustrated in FIG. 13 will be described. However it should be understood that the description of member 140b applies to both members 140a and 140b. The support member 140b is generally comprised of first pylon 141, second pylon 142 and isolator 144. The isolator 144 is a conventional sandwich mount well known to those skilled in the art and the isolator member 144 is fixed to the frame of the compressor 32 at a pedestal 146b by conventional fastening means such as bolts for example. The second pylon member 142 is comprised of a U-shaped body having parallel legs 148a, 148b that are joined by cross member 150. The pylon legs are made integral with the isolator by conventional fasteners that are passed laterally through openings in the legs 152a, 152b. Along the outwardly oriented surface of cross member 150 is a first frustoconical alignment member 154. When the first pylon 141 is seated on the second pylon 142, the first alignment member 154 is adapted to be nested within second frustoconical alignment member 156 located along lower crossmember 158 of first pylon 141. The first pylon has a substantially trapezoidal shape and includes second laterally extending cross member 160 that is joined to the first laterally extending cross member 158 by longitudinally extending members 162 and 163. A stiffening web 164 joins the cross member 160 and longitudinally extending members 162 and 163. The cross member 160 is attached to the tailcone ceiling by rivets or other conventional attachment means. A broken section of the tailcone ceiling 20 is represented in dashed font in FIG. 13. The first and second pylon members are made integral by conventional bolts or fasteners. The first bolt member 180 is inserted through the nested frustoconical members and additional bolts (not shown) are passed through aligned openings adjacent the frustoconical alignment members. These openings are identified as 166a and 166b in FIG. 13.

Support member 240 comprises isolator 243 fixed to the tailcone ceiling. Rigid links 242a and 242b join the isolator and the generator housing. The link ends are joined to spherical bearings fixed to the generator housing and to a spherical bearing along the exterior of the isolator. The bearings are of conventional design well known to one skilled in the art. As indicated above, the third support member 240 has a line of action 24. The support member spherical bearings serve to accommodate fore and aft and lateral displacement of the APU which are a result of among other things, large fluctuations in temperature in the tailcone chamber.

Removal and installation of the APU 30 will now be described. When it is necessary to remove the APU from the tailcone, access to the tailcone interior is achieved through panels 24 and 22 as previously described. A small crane is again located below the APU and the bolts connecting the second and first pylons and the rods and generator are removed and the unit is allowed to drop downward to the crane. When it is necessary to reinstall the APU, the alignment members 154 are nested within the corresponding mating alignment members 156 of the first pylon and then the fasteners 180 are passed through the nested alignment members. Then once the APU is in the required position, the remaining fasteners are inserted between the pylons and between the rods and the generator.

By the suspension systems of the present invention installation and removal of the APU from the tailcone is simplified. Vibration and displacement of the APU is also minimized.

While we have illustrated and described preferred embodiments of our invention, it is understood that these are capable of modification, and we therefore do not wish to be limited to the precise details set forth, but desire to avail ourselves to such changes and alterations as fall within the purview of the following claims.

We claim:

1. An aircraft auxiliary power unit combination located in an aircraft for supplying electrical power to the aircraft comprising:
  A. an auxiliary power unit, said power unit comprised of an electrical power generator and a prime mover with said generator driven by said prime auxiliary power unit having a center of gravity; mover, said auxiliary power unit having a center of gravity;
  B. a focalized suspension system supporting the power unit within the aircraft, the focalized suspension system having a plurality of focalized support isolator mounts for minimizing a vibration and a displacement of said auxiliary power unit, each of said focalized support isolator mounts having an inwardly angled line of action, said inwardly angled lines of action intersecting at a focal elastic center, said focal elastic center proximate said auxiliary power unit center of gravity.

2. The combination as claimed in claim 1 wherein the power unit has a first side, the focalized suspension system being located along the first side of the power unit.

3. The combination as claimed in claim 1 wherein the power unit has a second side, the focalized suspension system being located along the second side of the power unit.

4. The combination as claimed in claim 2 wherein the first side is located above the power unit.

5. The combination as claimed in claim 3 wherein the second side is located below the power unit.

6. The combination as claimed in claim 1 wherein the suspension system is comprised of three focalized support isolator mounts.

7. The combination as claimed in claim 6 wherein two of the focalized support isolator mounts are located adjacent one end of the power unit and the other focalized support isolator mount is located away from said one end.

8. The combination as claimed in claim 1 wherein a focalized support isolator mount is comprised of a first pylon, a second pylon and a pylon isolator, said pylon isolator and said upper pylon being made integral with the second pylon.

9. The combination as claimed in claim 8 wherein the first and second pylons comprise means for aligning the first and second pylons.

10. The combination as claimed in claim 8 including a first alignment member located on the first pylon and a second alignment member located on the second pylon, the second alignment member adapted to be nested in the first alignment member.

11. The combination as claimed in claim 10 wherein the alignment members are frustoconical.

12. The combination as claimed in claim 10 wherein the first and second pylons are made integral at the alignment members by an attachment member.

13. The combination as claimed in claim 1 wherein the prime mover is comprised of a compressor.

14. The combination as claimed in claim 5 wherein the suspension system is comprised of a bed with said focalized support isolator mounts fixedly located along said bed.

15. The combination as claimed in claim 14 wherein the bed is comprised of a plurality of first members extending in a first direction and a plurality of second members extending in a second direction.

16. The combination as claimed in claim 15 wherein the focalized support isolator mounts are fixed to the members extending in the first direction.

17. The combination as claimed in claim 15 wherein the bed is comprised of a first pair of first members and a second pair of first members, each pair of members being separated by a gap, said gap adapted to received an anchor member therein.

18. The combination as claimed in claim 10 wherein the suspension system includes a latch connection for maintaining the power unit at a fixed position.

19. The combination as claimed in claim 18 wherein the combination is located in an aircraft having an aircraft structural member, said latch connection extending between a suspension system second member and the structural member.

* * * * *

UNITED STATES PATENT AND TRADEMARK OFFICE
CERTIFICATE OF CORRECTION

PATENT NO. : 6,581,874 B2
DATED : June 24, 2003
INVENTOR(S) : Jacques Lemire et al.

It is certified that error appears in the above-identified patent and that said Letters Patent is hereby corrected as shown below:

Column 7,
Lines 40-41, delete "auxiliary power unit having a center of gravity;"

Column 8,
Line 49, replace "10" with -- 14 --

Signed and Sealed this

Fifth Day of April, 2005

JON W. DUDAS
*Director of the United States Patent and Trademark Office*